(12) United States Patent
Shimizu et al.

(10) Patent No.: US 8,695,328 B2
(45) Date of Patent: Apr. 15, 2014

(54) EXHAUST PURIFYING APPARATUS OF SADDLE-RIDE TYPE VEHICLE

(75) Inventors: Takahiko Shimizu, Wako (JP); Makoto Mitsukawa, Wako (JP); Kuniharu Kimura, Wako (JP); Takatoshi Tatsumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 213 days.

(21) Appl. No.: 13/407,433

(22) Filed: Feb. 28, 2012

(65) Prior Publication Data

US 2012/0222414 A1 Sep. 6, 2012

(30) Foreign Application Priority Data

Mar. 2, 2011 (JP) ................................. 2011-045205

(51) Int. Cl.
*F01N 3/00* (2006.01)
*F01N 3/02* (2006.01)

(52) U.S. Cl.
USPC .................................. 60/290; 60/289; 60/317

(58) Field of Classification Search
USPC ............ 60/287, 289, 290, 293, 307, 308, 317
See application file for complete search history.

(56) References Cited

U.S. PATENT DOCUMENTS

2007/0107429 A1* 5/2007 Squires ........................ 60/605.1
2007/0240404 A1* 10/2007 Pekrul et al. .................... 60/282

FOREIGN PATENT DOCUMENTS

| JP | 58093916 A | * | 6/1983 | ................ F01N 3/34 |
| JP | 58106118 A | * | 6/1983 | ................ F01N 3/34 |
| JP | 2002-227641 A | | 8/2002 | |
| JP | 2002227641 A | * | 8/2002 | ................ F01N 3/34 |
| JP | 2002235535 A | * | 8/2002 | ................ F01N 3/34 |

* cited by examiner

*Primary Examiner* — Audrey K Bradley
(74) *Attorney, Agent, or Firm* — Birch, Stewart, Kolasch & Birch, LLP (57) ABSTRACT

An exhaust purifying apparatus achieving placement of components so as to prevent an increase in the size of the vehicle caused by the placement of the exhaust purifying apparatus while maintaining the performance of the exhaust purifying apparatus by secondary air in a saddle-ride type vehicle. An exhaust purifying apparatus of a saddle-ride vehicle includes a secondary air supply pipe of which one end is connected an exhaust passage of an internal combustion engine. A secondary air control valve is connected with the other end of the secondary air supply pipe for controlling the supply of secondary air to the secondary air supply pipe. An outdoor air introduction passage is connected to the secondary air control valve, wherein an air filter for secondary air and a resonant passage are installed in the middle of the outdoor air introduction passage.

20 Claims, 5 Drawing Sheets

EXHAUST PURIFYING APPARATUS OF SADDLE-RIDE TYPE VEHICLE

CROSS-REFERENCE TO RELATED APPLICATIONS

The present application claims priority under 35 USC 119 to Japanese Patent Application No. 2011-045205 filed Mar. 2, 2011 the entire contents of which are hereby incorporated by reference.

BACKGROUND OF THE INVENTION

1. Field of the Invention

The present invention relates to an exhaust purifying apparatus in a saddle-ride type vehicle such as a motorcycle or a buggy car. More particularly, to an exhaust purifying apparatus that supplies secondary air to an exhaust system of an internal combustion engine to purify unburnt components in exhaust gas.

2. Description of Background Art

For example, JP-A No. 2002-227641 (FIGS. 1 to 4) discloses a secondary air that is supplied to an exhaust system of an internal combustion engine in order to reburn unburnt components in the exhaust gas even in a saddle-ride type vehicle such as a motorcycle or a buggy car, against exhaust gas regulation.

As disclosed in JP-A No. 2002-227641 (FIGS. 1 to 4), in a motorcycle with a power unit, the other side of a secondary air supply pipe of which one side is connected to the exhaust system (in an exhaust port) of the internal combustion engine is connected to a secondary air control valve and a secondary air filter is connected to an upstream side of the secondary air control valve.

In addition, an air suction pipe at an upstream side of the secondary air filter extends to a vehicle rear end along an upper side of a main frame of the motorcycle and an inlet port is opened at the rear end.

In an exhaust purifying apparatus that has a secondary air control valve and a secondary air filter, outdoor air is sucked from an air suction pipe at an upstream side of the secondary air filter, and supplies the outdoor air as secondary air to an exhaust system. JP-A No. 2002-227641 (FIGS. 1 to 4) discloses that a storage box and a fuel tank which are parallel to each other in a forward and backward direction of a vehicle are installed on an upper part of a main frame below an occupant seat, and the secondary air control valve and the secondary air filter are installed between the storage box and the fuel tank at the right side and the left side of the vehicle, respectively, and as a result, a pipe connecting the secondary air filter and the secondary air control valve is installed horizontally between the storage box and the fuel tank.

Further, the air suction pipe positioned at the upstream side of the secondary air filter extends at the right side of the vehicle between the storage box and the fuel tank and thereafter, extends to a vehicle rear end along an upper part of a right main frame of a motorcycle and an inlet port is supported on the main frame while being covered with a breathable sponge damper at the rear end.

As a result, the height of an occupant seat is increased due to the placement of the pipe to increase the size of the vehicle and further, when the increase of the height of the occupant seat is suppressed, the position of the main frame is lowered to restrict a vertical swing amount of a power unit.

SUMMARY AND OBJECTS OF THE INVENTION

According to an embodiment of the present invention, an exhaust purifying apparatus achieves the placement of components so as to prevent an increase in the size of a vehicle caused by the placement of the exhaust purifying apparatus while maintaining the performance of the exhaust purifying apparatus by secondary air in the saddle-ride type vehicle.

In order to achieve the above object, according to an embodiment of the present invention, an exhaust purifying apparatus of a saddle-ride type vehicle includes a secondary air supply pipe wherein one end is connected to an exhaust passage of an internal combustion engine with a secondary air control valve connected with the other end of the secondary air supply pipe and controlling the supply of secondary air to the secondary air supply pipe. An outdoor air introduction passage to the secondary air control valve is provided wherein an air filter for secondary air and a resonant passage are installed in the middle of the outdoor air introduction passage.

According to an embodiment of the present invention, the resonant passage is installed in the outdoor air introduction passage at an upstream side of the air filter.

According to an embodiment of the present invention, the exhaust purifying apparatus is distributively placed on the top of an upper rear fender member covering an upper side of a rear wheel below an occupant seat in the saddle-ride type vehicle.

According to an embodiment of the present invention, the secondary air control valve and the air filter are mounted on the upper rear fender member covering the upper side of the rear wheel.

According to an embodiment of the present invention, an axis of an inlet opening of the secondary air control valve is oriented in a rear direction of a forward-rearward direction of a vehicle and the air filter is placed in connection with the outdoor air introduction passage from a rear side of the vehicle of the secondary air control valve.

According to an embodiment of the present invention, the secondary air control valve is installed at one side of a front part of the upper rear fender, the air filter is installed at a rear part of the upper rear fender, and the outdoor air introduction passage at the upstream side of the air filter is installed to extend to the other side of the front part of the upper rear fender.

According to an embodiment of the present invention, since a flow is straightened by reducing pulsation in an outdoor air introduction passage of secondary air by a resonant passage, intake efficiency increases and noise generated from the edge of an outdoor air introduction opening by pulsation decreases. Further, the degree of freedom in placement of up to a secondary air control valve and an air filter, and the edge of the outdoor air introduction opening of the outdoor air introduction passage at the upstream side thereof increases to easily distributively place components of the exhaust purifying apparatus in gaps of the vehicle.

As a result, it is possible to provide the exhaust purifying apparatus capable of preventing the increase in the size of the vehicle caused by the placement of the exhaust purifying apparatus while maintaining the performance of the exhaust purifying apparatus by the secondary air.

According to an embodiment of the present invention, noise generated from the edge of the outdoor air introduction opening of the outdoor air introduction passage can be reduced.

According to an embodiment of the present invention, by distributively placing the exhaust purifying apparatus on the top surface of an upper rear fender member, a required vertical installation height is decreased to prevent foreign matter from intruding from the environment and suppress even a seat height.

Further, by this configuration, ride quality can be improved by securing a vertical swing height of a rear wheel.

According to an embodiment of the present invention, since the secondary air control valve and the air filter can be sub-assembled in advance on the upper rear fender member, the assemblability of the exhaust purifying apparatus is improved.

According to an embodiment of the present invention, vacuum of an inlet opening of the secondary air valve can effectively applied up to the air filter to improve secondary air supply performance.

According to an embodiment of the present invention, an outdoor air introduction passage is distributively placed on the upper rear fender member in a U shape, the height of an occupant seat is suppressed, and internal resistance of the outdoor air introduction passage is reduced to further improve the secondary air supply performance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an exhaust purifying apparatus of a saddle-ride type vehicle such as a motorcycle or a buggy car according to an embodiment of the present invention will be described with reference to FIGS. 1 to 5.

Directions such as front and rear, left and right, and up and down in a description of this specification and claims are based on the direction of a vehicle while an exhaust purifying apparatus according to an embodiment is mounted on a saddle-ride type vehicle. In drawings, arrow FR indicates a front of the vehicle, arrow LH indicates a left side of the vehicle, arrow RH indicates a right side of the vehicle, and arrow UP indicates an upper side of the vehicle.

Further, in the drawings, an added small black arrow indicates the flow of secondary air that is sucked from outdoor air and an added small arrow having a white inside mimetically indicates an intake direction of vacuum from an intake pipe by a vacuum introduction pipe.

Figure 1:
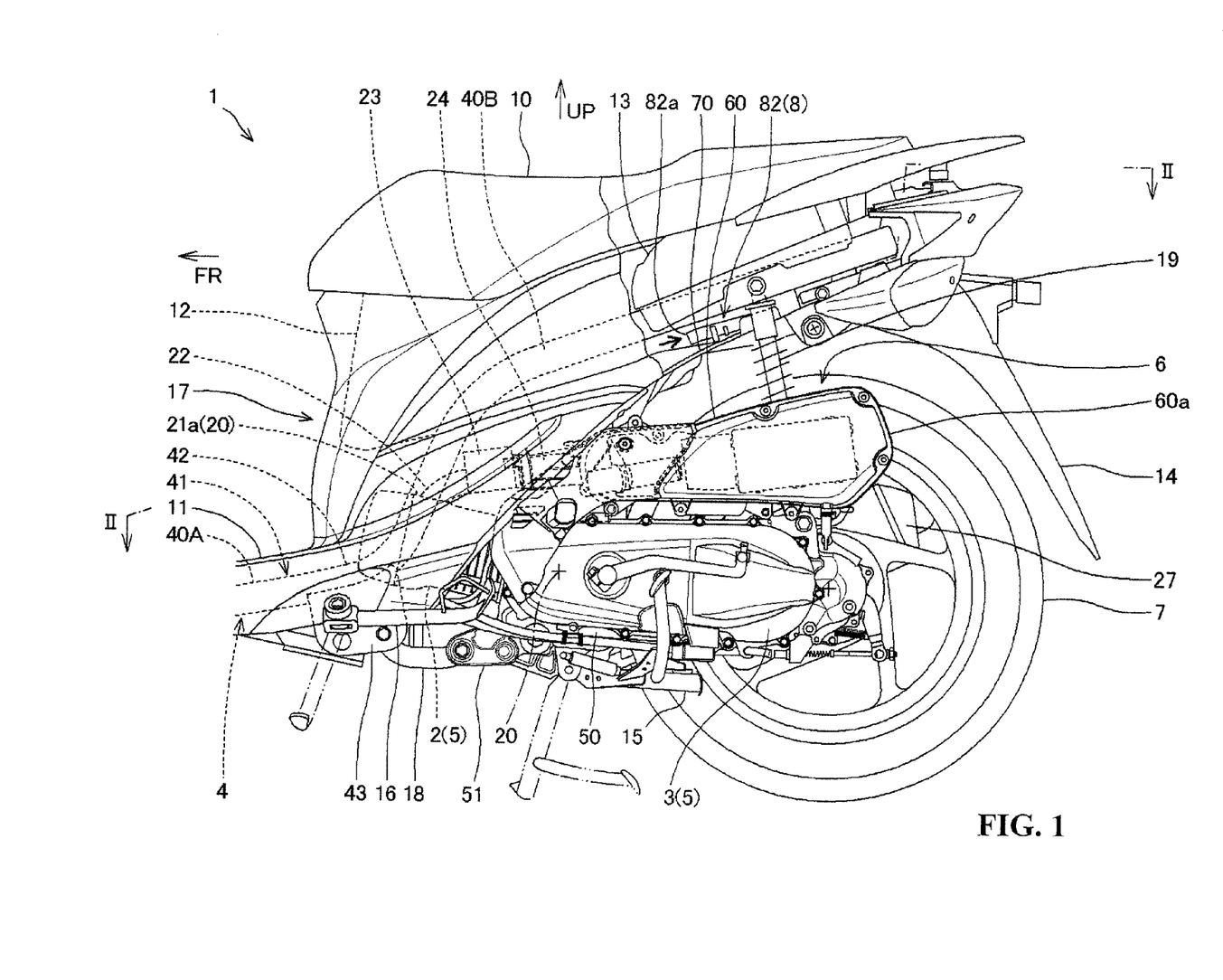
FIG. 1 is a left side view of a principal part of a partially cut body cover with no front wheel side shown in a motorcycle according to an embodiment of the present invention.

As a saddle-ride type vehicle according to an embodiment of the present invention, in FIG. 1, a front wheel side of a scooter type motorcycle 1 is not shown and a left side view of a principal part in a body cover which is partially cut is shown.

In the motorcycle 1 of the embodiment, a rear-wheel power transmission device 3 is integrated with an internal combustion engine 2 and a swing type power unit (hereinafter, referred to as a 'power unit') 5 mounted on a vehicle body frame 4 to be vertically swingable is provided below an occupant seat 10 and the internal combustion engine 2 is a single cylinder 4-stroke cycle internal combustion engine. The power unit 5 is mounted on the motorcycle 1 while a crankshaft 20 of a power unit case 50 is oriented in a vehicle width direction of the motorcycle 1.

Further, an intake air cleaner 6 of the internal combustion engine 2 is supported on the power unit 5.

As shown in FIG. 1, in the motorcycle 1 of the embodiment, although not shown, a pair of left and right front forks journaling a front wheel is rotatably supported on a head pipe positioned at a front end portion of the vehicle body frame 4 to be steered through a steering stem. Further, a steering handlebar is mounted on an upper part of the steering stem.

A main frame of the vehicle body frame 4 is connected to an oblique lower rear part from the head pipe and as shown in FIG. 1, the vehicle body frame is branched into a pair of left and right main frames 40A and 40A to extend substantially horizontally in a lower part of the vehicle frame, and forms a saddle 41 improving sit-in easiness between the head pipe and the occupant seat 10 as the bottom.

On the saddle 41, a step floor 11 is installed in connection with a lower rear part of a front cover not shown.

The main frames 40A and 40A form a bend section 42 in the rear of the step floor 11, extend obliquely upward toward a rear side as a pair of left and right rear main frames 40B and 40B, and thereafter, are bent in order to decrease an inclination to extend to the rear side.

On the rear main frames 40B and 40B, a storage box 12 and a fuel tank 13 and the like are supported from a front side and the occupant seat 10 is supported to cover upper parts thereof.

The main frames 40A and 40A and the rear main frames 40B and 40B that are bilaterally symmetric with each other are each connected horizontally by a vehicle width direction-frame.

Further, in FIG. 1, reference sign 14 represents a rear fender, reference sign 15 represents a main stand, and reference sign 16 represents a side stand. When the main stand 15 and the side stand 16 while driving are unused, they are illustrated as solid lines and when used, they are illustrated by two-dot dashed lines.

The vehicle body frame 4 is covered with a body cover 17 mainly made of a synthetic resin.

The rear fender 14 covering the rear part of the rear wheel 7 is connected with an upper rear fender member 70 extending to the front side of the vehicle while covering the upper part of the rear wheel 7 at the upper end thereof.

Figure 2:
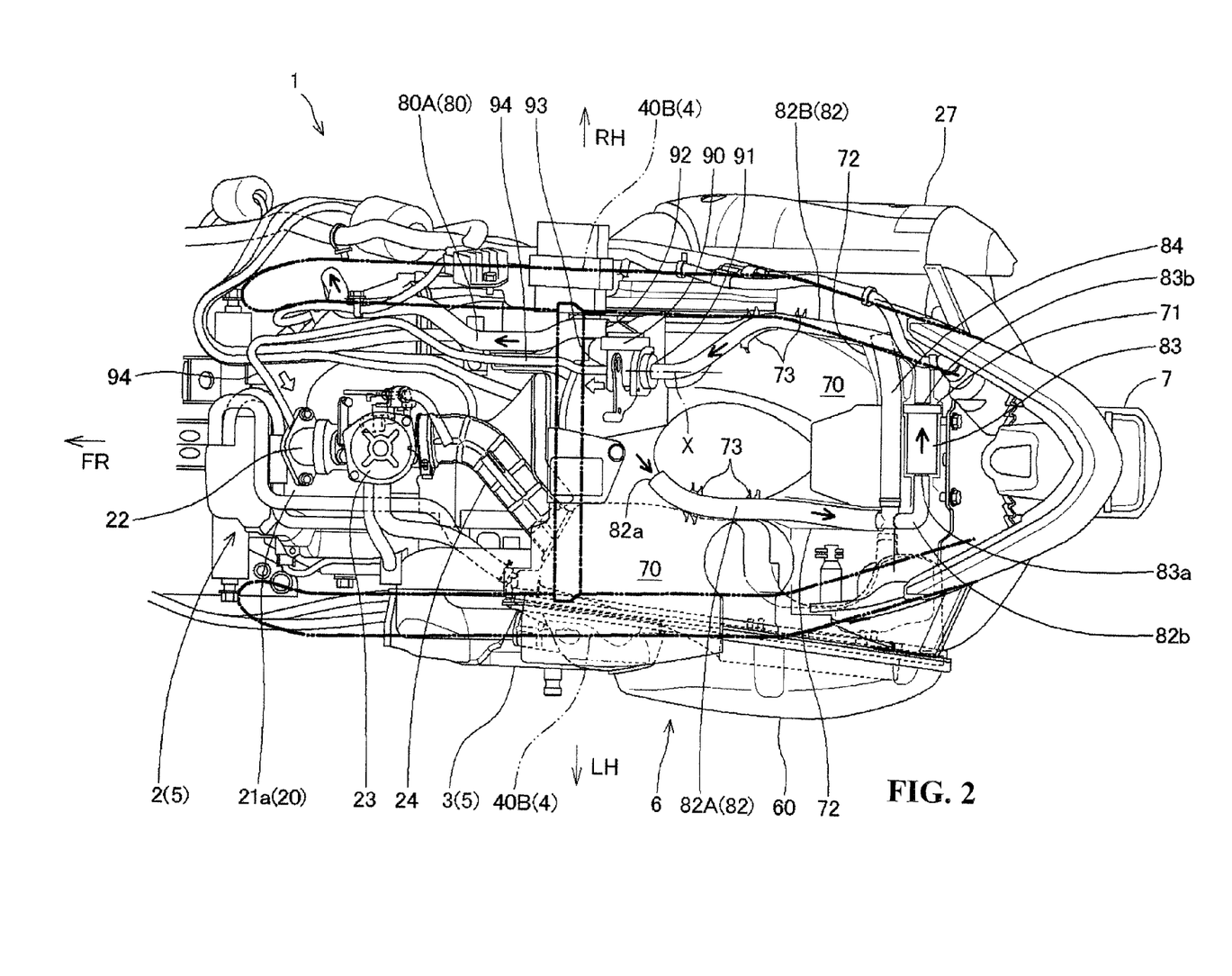
FIG. 2 is a plan view of the principal part of the motorcycle according to the embodiment shown with no body cover shown, which is viewed substantially in the direction of arrow II-II in FIG. 1 and shows the placement of an exhaust purifying apparatus of the embodiment on an upper rear fender member and a swing-type power unit.
Figure 3:
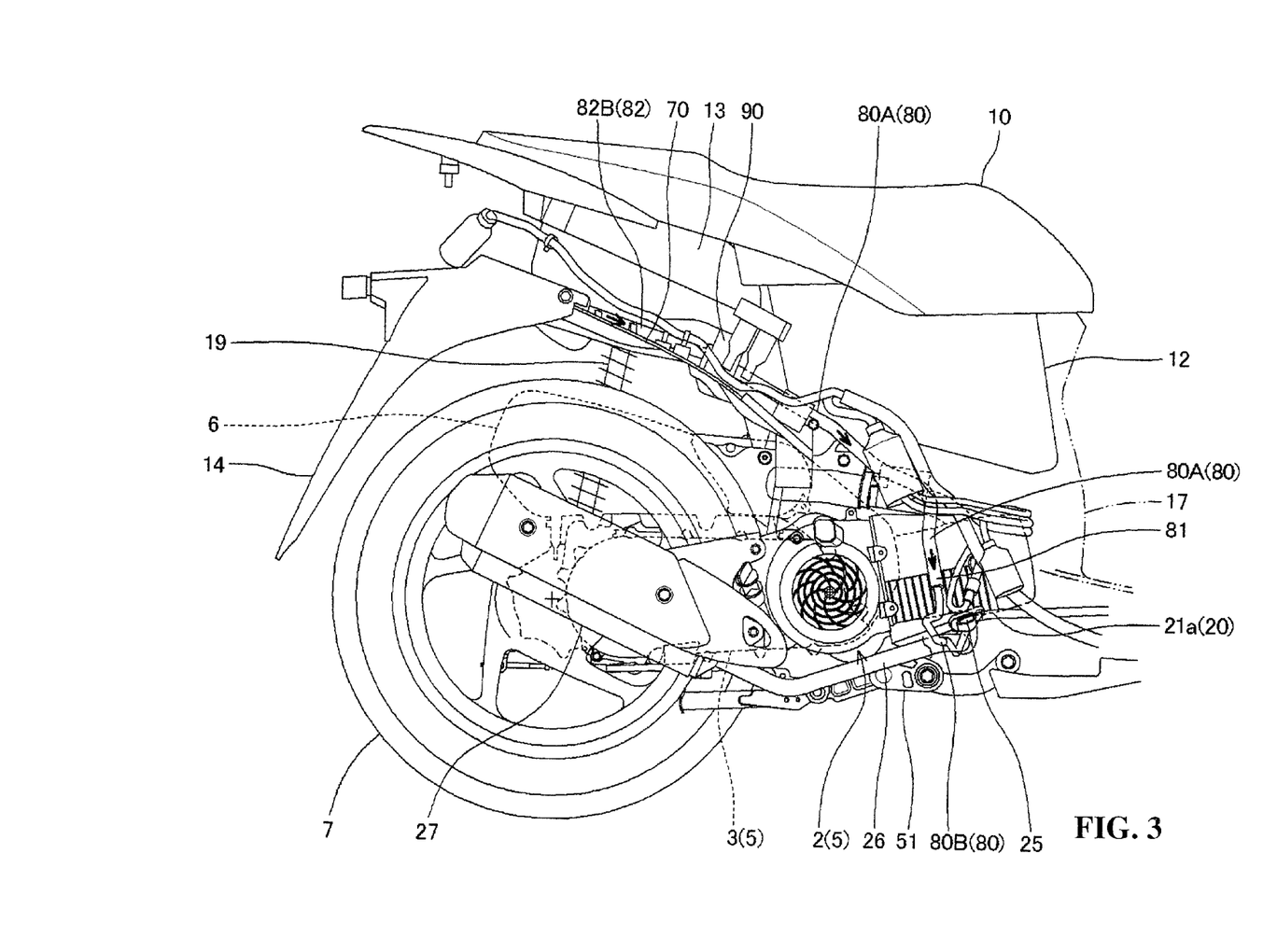
FIG. 3 is a right side view of a principal part except for a vehicle body frame and a body cover with no front wheel side shown in a motorcycle according to an embodiment of the present invention.

The upper rear fender member 70 is mounted in a bottom plate shape blocking upper and lower parts between the left and right rear main frames along lower parts of the left and right rear main frames 40B and 40B that are bent in order to decrease the inclination to extend to a rear end and protects apparatuses installed between the rear main frames 40B and 40B and upper parts of the rear main frames or devices such as the storage box 12 and the fuel tank 13 from water, dust, and the like splashed from the rear wheel 7 (see FIG. 2).

The power unit 5 is formed by integrating the internal combustion engine 2 positioned in the front side thereof and the power transmission device 3 positioned at a rear left side thereof with each other. A hanger section 51 is provided in a front lower part of the power unit case 50.

The power unit 5 is supported on a pivot plate 43 mounted on the bend section 42 from the main frames 40A and 40A to the rear main frames 40B and 40B to be swingable vertically via a suspension link 18 in the hanger section 51. Further, a rear left side of the power unit 5 is supported to be closable and separable with respect to the rear main frames 40B and 40B via a rear shock absorber 19.

Further, the rear wheel 7 which is a driving wheel of the motorcycle 1 is journaled to be adjacent to a right side of a rear end portion of the power transmission device 3 installed in a rear part of the power unit case 50.

A cylinder section 21 of the internal combustion engine 2, with a cylinder block, a cylinder head, and a cylinder head cover fastened to be sequentially stacked, which is inclined forward substantially horizontally, is provided at the front side of the power unit case 50.

At a left side of the rear wheel 7, the air cleaner case 60 of the air cleaner 6 is supported on an upper part of the power transmission device 3 of the power unit 5, i.e., the upper part of the power unit case 50 with a rear end 60a thereof placed in the rear of the rear shock absorber 19 mounted between the vehicle body frame 4 and the power unit 5.

An intake pipe 22 extending from an upper part of a cylinder head 21a of a cylinder section 21 of the internal combustion engine 2 is bent rearward to be connected to a front part of the air cleaner case 60 via a carburetor 23 and a connecting tube 24 (see FIG. 2).

Further, an exhaust pipe 26 extends downward from an exhaust port 25 (see FIG. 3) of the cylinder head 21a of the cylinder section 21 and the exhaust pipe 26 bypasses to a right side to be connected to a silencer 27 installed at a right side of a vehicle body.

As shown in FIG. 2, an exhaust purifying apparatus 8 of the embodiment includes a secondary air supply pipe 80 having a downstream end connected to the side of an exhaust port 25 (see FIG. 3) constituting an exhaust passage of the internal combustion engine 2, a secondary air control valve 90 connected to an upstream end of the secondary air supply pipe 80 and controlling the supply of secondary air to the secondary air supply pipe 80, and an outdoor air introduction passage 82 having a downstream end connected to the secondary air control valve 90 and introducing secondary air to the secondary air control valve 90, in order to burn unburnt components such as HC and CO contained in exhaust gas by supplying secondary air to an exhaust system.

An upstream end of the outdoor air introduction passage 82 is opened as an outdoor air introduction opening 82a and an air filter 83 for secondary air is interposed in the middle of the outdoor air introduction passage 82.

The outdoor air introduction passage 82 is composed of a downstream outdoor air introduction passage 82B downstream of the air filter 83 and an upstream outdoor air introduction passage 82A upstream of the air filter 83. A resonant passage 84 is formed in the upstream outdoor air introduction passage 82A.

The exhaust purifying apparatus 8 is distributively placed on the top of the upper rear fender member 70 covering the upper side of the rear wheel 7 below the occupant seat 10 of the motorcycle 1.

The secondary air control valve 90 is fastened and mounted to a right side of the top of the front part of the upper rear fender member 70 while an axis X of an inlet opening 91 of the secondary air control valve is oriented in a rear direction of a forward-rearward direction of the vehicle and the inlet opening 91 faces the rear side of the vehicle.

The downstream outdoor air introduction passage 82B connected to the inlet opening 91 extends rearward substantially along the inside of the right rear main frame 40B and is bent smoothly toward a central direction (left direction) of the vehicle in the rear part of the upper rear fender member 70 to be connected to an outlet 83b of the air filter 83 that is oriented to a right direction of the vehicle.

As a result, vacuum of the inlet opening 91 of the secondary air control valve 90 can be effectively applied up to the air filter 83.

An inlet 83a of the air filter 83 is oriented to the left direction of the vehicle and the upstream outdoor air introduction passage 82A is connected to the inlet. The upstream outdoor air introduction passage 82A is bent smoothly toward the front side of the vehicle, extends forward between the left and right rear main frames 40B and 40B around the left rear main frame 40B, and thereafter, is opened as the outdoor air introduction opening 82a.

At a slightly upstream side (front side) of the bend section 82b of the upstream outdoor air introduction passage 82A, a left end of the resonant passage 84 having a tubular shape of which a right end is closed, which is oriented horizontally in the vehicle, is branched and connected. As a result, pulsation in the outdoor air introduction passage 82 is reduced by the resonant passage 84, the flow of intake air is straightened to increase intake efficiency and reduce noise generated from an opening edge of the outdoor air introduction opening 82a by pulsation.

Further, the air filter 83 is fastened and mounted so that a cover member not shown covers the top held by a holding recessed portion 71 formed in the rear part of the upper rear fender member 70 and the outdoor air introduction passage 82 or the resonant passage 84 is also placed in a holding groove 72 formed in the upper rear fender member 70 and further, is fixed by a rib 73. The secondary air control valve 90 is fastened and mounted onto a front part which is formed at a relatively low position of the upper rear fender member 70.

Accordingly, the outdoor air introduction passage 82 is distributively placed smoothly on the upper rear fender member 70 in a U shape and internal resistance of the outdoor air introduction passage 82 can be reduced to improve secondary air supply performance.

Further, the constitutional equipment of the exhaust purifying apparatus 8 are surrounded by the left and right rear main frames 40B and 40B, distributively placed on the upper rear fender member 70 flatly by suppressing a vertical mounting height, and connected to the outdoor air introduction passage 82, and as a result, the mounting heights of the storage box 12, the fuel tank 13, and the like mounted on the left and right rear main frames 40B and 40B are not increased.

Therefore, the height of the occupant seat 10 mounted while covering the storage box and the fuel tank 13 can also be maintained to be low and ride quality can be improved by securing a vertical swing height of the rear wheel 7.

Further, the constitutional equipment of the exhaust purifying apparatus 8 are protected by the left and right rear main frames 40B and 40B.

Further, since the secondary air control valve 90 and the air filter 83 are mounted on the upper rear fender member 70, sub-components may be assembled in advance when the exhaust purifying apparatus 8 is mounted on the motorcycle 1, thereby also improving assemblability.

An outlet opening 92 is formed in the secondary air control valve 90 to be oriented forward and secondary air that is controlled is supplied to the exhaust system of the internal combustion engine 2.

An upstream end of the secondary air supply pipe 80 is connected to the outlet opening 92 and a downstream end of the secondary air supply pipe is connected to the exhaust port 25 of the cylinder head 21a which is the exhaust passage to be opened.

The secondary air supply pipe 80 is composed of an upstream secondary air supply pipe 80A at the side connected to the secondary air control valve 90 and a downstream secondary air supply pipe 80B at the side connected with the exhaust port 25, which are connected and communicated with each other through a connector 81.

In the embodiment, the downstream secondary air supply pipe 80B is fixed to be connected and communicated with the inside of the exhaust port 25 through a connection hole not shown formed in the exhaust port 25.

Further, the "exhaust passage" in the present invention to which the downstream secondary air supply pipe 80B is connected is not limited thereto and the exhaust pipe 26 connected to the exhaust port 25 may be fixed as the exhaust passage so that the downstream secondary air supply pipe 80B is connected and communicated with the exhaust pipe 26.

The downstream secondary air supply pipe 80B is connected to the cylinder head 21a or a member which is close thereto and is piped therearound, and as a result, an appropriate metal pipe capable of enduring high temperature is used as the downstream secondary air supply pipe.

Meanwhile, the secondary air control valve 90 is fixed onto the upper rear fender member 70 fixed to the vehicle body frame 4 and the cylinder head 21a swings with respect to the vehicle body frame 4 as a part of the power unit 5. Therefore, the upstream secondary air supply pipe 80A adopts a pipe made of an appropriate flexible material such as a rubber material in order to connect the secondary air control valve 90 and the downstream secondary air supply pipe 80B while absorbing the swing.

Further, a vacuum introduction portion 93 is installed in the secondary air control valve 90 to be oriented forward in parallel to the outlet opening 92 and one end of a vacuum introduction pipe 94 is connected to the secondary air control valve 90.

The other end of the vacuum introduction pipe 94 is connected to an intake pipe 22 which is an intake downstream side of the carburetor 23 and is communicated with the inside of the intake pipe.

Figure 4:
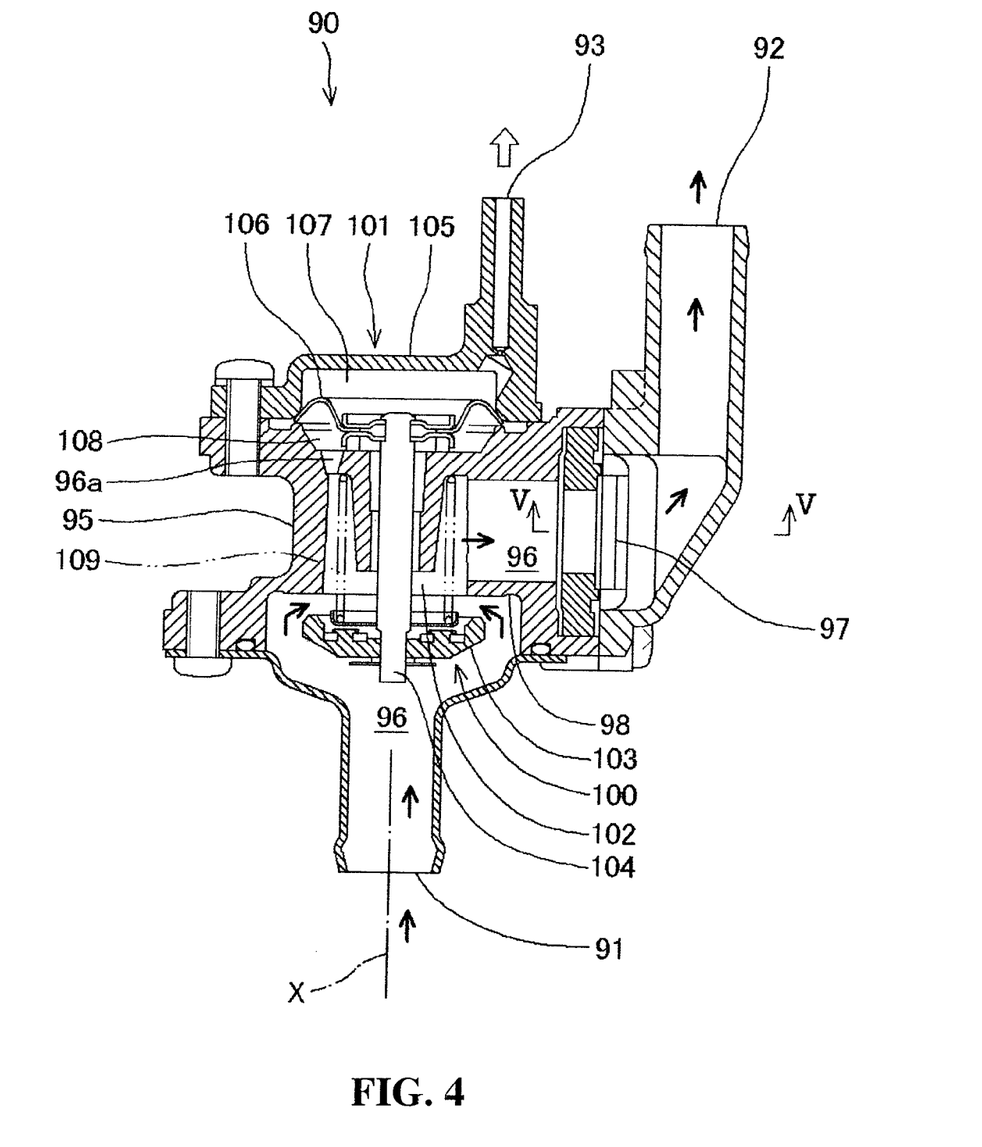
FIG. 4 is a cross-sectional explanatory diagram of a secondary air control valve according to the embodiment.
Figure 5:
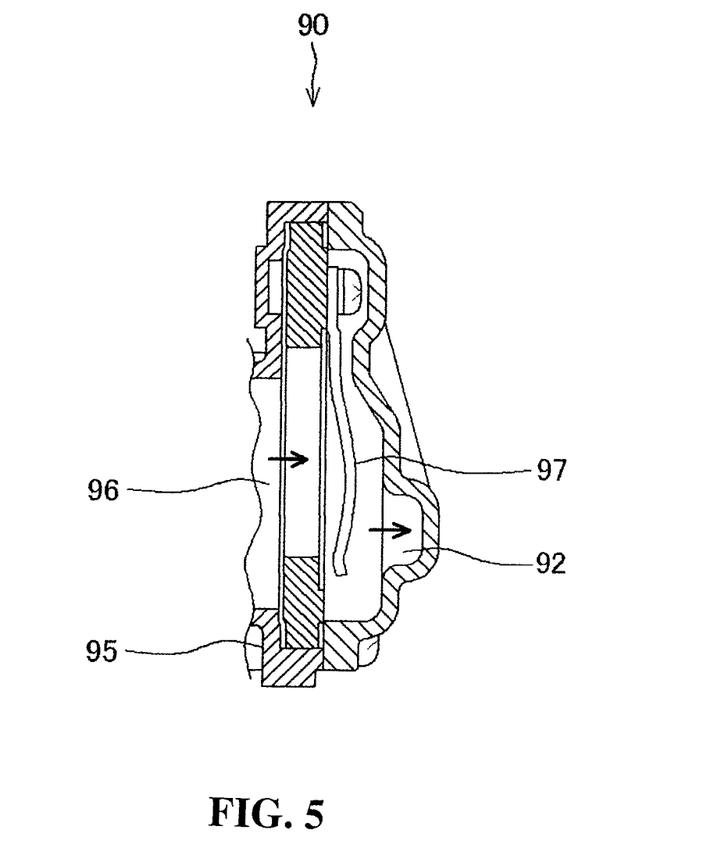
FIG. 5 is a cross-sectional explanatory diagram of a reed valve part in the second air control valve viewed in the direction of arrow V-V in V in FIG. 4.

As shown in FIGS. 4 and 5, the secondary air control valve 90 includes a body case 95 and the inlet opening 91 and the outlet opening 92 of secondary air are formed in the body case 95. The inlet opening 91 and the outlet opening 92 are opened to a secondary air chamber 96 in the body case 95. Further, the outdoor air introduction passage 82 is connected to the inlet opening 91 and further, the secondary air supply pipe 80 is connected to the outlet opening 92.

A reed valve 97 is installed around the outlet opening 92 in the secondary air chamber 96 of the body case 95. The reed valve 97 is opened or closed depending on exhaust pulsation pressure generated in the exhaust system. When vacuum in the exhaust port 25 is applied to the outlet opening 92 via the secondary air supply pipe 80, the reed valve 97 is opened, and the inlet opening 91 and the outlet opening 92 are communicated with each other.

Further, a cut valve 100 for acquiring appropriate secondary air depending on an operating state of the internal combustion engine 2 and an actuator 101 for driving the cut valve 100 are incorporated in the body case 95.

The cut valve 100 is provided with a valve element 103 that is close to and separate from an opening portion 102 formed in a partition wall 98 partitioning an inner part of the secondary air chamber 96 between the inlet opening 91 and the reed valve 97, and a valve shaft 104 supporting the valve element 103.

An actuator 101 is provided with a cover 105 covered on the body case 95 and a diaphragm 106 is stored inside of the cover 105. The diaphragm 106 partitions the inner part of the cover 105 into a vacuum chamber 107 and a secondary air pressure chamber 108 that is communicated with the secondary air chamber 96 through a through-hole 96a. The vacuum chamber 107 is connected to the intake pipe 22 via the vacuum introduction pipe 94 and intake vacuum in the intake pipe 22 is introduced to the vacuum chamber 107 while the internal combustion engine 2 is being operated.

The valve shaft 104 of the cut valve 100 slidably penetrates the body case 95 to connect to the diaphragm 106. The diaphragm 106 is pressed to the secondary air pressure chamber 108 by a spring 109. As a result, the valve element 103 is separated from the opening portion 102 of the partition wall 98 and the cut valve 100 is maintained to be in a normally opened state.

As described above, since exhaust pulsation is generated in the exhaust port 25 as the exhaust passage while the internal combustion engine 2 is being operated with the cut valve 100 opened, when the vacuum in the exhaust port 25 is transferred to the reed valve 97 of the secondary air control valve 90 through the secondary air supply pipe 80, the reed valve 97 is opened and outdoor air is sucked as secondary air from the outdoor air introduction opening 82a of the outdoor air introduction passage 82.

The sucked secondary air is introduced to the air filter 83 through the upstream outdoor air introduction passage 82A to filter dust. Cleaned secondary air filtered by the air filter 83 passes through the reed valve 97 of the secondary air control valve 90 through the downstream outdoor air introduction passage 82B, is injected into the exhaust port 25 through the secondary air supply pipe 80, and is mixed with exhaust gas that flows in the exhaust port 25. As a result, unburnt components in the exhaust gas are burnt in the exhaust system such as the exhaust port 25 or the exhaust pipe 26 and the exhaust gas is purified.

Meanwhile, during deceleration driving such as the time when a throttle valve not shown of the carburetor 23 is rapidly closed, a venture passage of the carburetor 23 is narrowed, such that the flow rate of intake air increases and the amount of fuel sucked out increases. As a result, an air-fuel mixture is temporarily in an excessive density state and misfire may occur in a combustion chamber not shown of the internal combustion engine 2 and a large amount of unburnt air-fuel mixture is discharged into the exhaust port 25. In this case, when secondary air is injected into the exhaust port 25, the unburnt air-fuel mixture is mixed with secondary air to be explosively burnt at an appropriate air-fuel ratio, in other words, afterburn may occur.

However, in the secondary air control valve 90 of the embodiment, since the vacuum chamber 107 and the intake pipe 22 are communicated with each other through the vacuum introduction pipe 94, when the vacuum in the intake pipe 22 increases during deceleration driving, the diaphragm 106 is deformed toward the vacuum chamber 107 against pressing force of the spring 109. Therefore, the valve element 103 of the cut valve 100 is pressed to the opening portion 102 of the partition wall 98 in the secondary air pressure chamber 108 to close the opening portion 102. As a result, during the deceleration driving, secondary air stops being supplied to the exhaust port 25 and the afterburn is prevented from occurring.

Hereinafter, a characteristic of the exhaust purifying apparatus of the saddle-ride type vehicle of the embodiment will be described.

That is, in the exhaust purifying apparatus of the saddle-ride type vehicle of the embodiment, the exhaust purifying apparatus 8 of a motorcycle 1 including a secondary air supply pipe 80 of which a downstream end is connected to an exhaust port 25 as an exhaust passage of an internal combustion engine 2, a secondary air control valve 90 connected with an upstream end of the secondary air supply pipe 80 and controlling the supply of secondary air to the secondary air supply pipe 80, and an outdoor air introduction passage 82 to the secondary air control valve 90, an air filter 83 for secondary air and a resonant passage 84 are installed in the middle of an outdoor air introduction passage 82.

Therefore, since a flow is straightened by reducing pulsation in the outdoor air introduction passage 82 of secondary air by the resonant passage 84, intake efficiency increases and noise generated from an opening edge of an outdoor air introduction opening 82a by pulsation is reduced. Further, the degree of freedom in placement of up to the secondary air control valve 90, the air filter 83, and the opening edge of the outdoor air introduction opening 82a of the outdoor air introduction passage 82 (82A) at an upstream side thereof increase and it becomes easy to distributively place each part of the exhaust purifying apparatus 8 at a gap of the motorcycle 1.

As a result, the exhaust purifying apparatus 8 can be implemented, which is capable of preventing the motorcycle 1 from being bigger by the placement of the exhaust purifying apparatus 8 while maintaining the performance of the exhaust purifying apparatus 8 by secondary air.

Further, the resonant passage 84 is installed in the outdoor air introduction passage 82 (82A) at an upstream side of the air filter 83.

As a result, the noise generated from the opening edge of the outdoor air introduction opening 82a of the outdoor air introduction passage 82 can be further reduced.

Further, the exhaust purifying apparatus 8 is distributively placed on the top of an upper rear fender member 70 covering the upper side of a rear wheel 7 below an occupant seat 10 of the motorcycle 1.

As described above, the exhaust purifying apparatus is distributively placed on the top of the upper rear fender member 70 to narrow a required vertical mounting height, thereby reducing the intrusion of foreign matter from the environment and further, suppressing a seat height. Further, by this configuration, ride quality can be improved by securing a vertical swing height of the rear wheel 7.

Further, since the secondary air control valve 90 and the air filter 83 are mounted on the upper rear fender member 70 covering the upper side of the rear wheel 7, sub-components of the secondary air control valve 90 and the air filter 83 can be assembled in advance on the upper rear fender member 70, thereby improving the assemblability of the exhaust purifying apparatus 8.

In addition, an axis X of the inlet opening 91 of the secondary air control valve 90 is oriented in a rear direction of a forward-rearward direction the vehicle and the air filter 83 is placed in connection with the outdoor air introduction passage 82 from the rear side of the vehicle of the secondary air control valve 90, and as a result, the vacuum of the inlet opening 91 of the secondary air control valve 90 can be effectively applied up to the air filter 83, thereby improving secondary air supply performance.

Moreover, the secondary air control valve 90 is installed at a right side of a front part of the upper rear fender member 70 and the air filter 83 is installed at a rear part of the upper rear fender member 70 and the outdoor air introduction passages 82 (82A) at an upstream side of the air filter 83 is installed to extend to a left side of the front part of the upper rear fender member 70. Therefore, the outdoor air introduction passage 82 is distributively placed on the upper rear fender member 70 in a U shape to suppress the height of the occupant seat 10 and reduce internal resistance of the outdoor air introduction passage 82, thereby improving secondary air supply performance.

As set forth above, although the embodiments of the present invention have been described, the aspects of the present invention are not limited to the embodiments and the present invention may be implemented in various aspects within the spirit of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust purifying apparatus comprising:
a secondary air supply pipe having a first end and a second end, said first end being adapted to be connected to an exhaust passage of an internal combustion engine;
a secondary air control valve having an outlet opening being connected to the second end of the secondary air supply pipe for controlling a supply of secondary air to the secondary air supply pipe;
an ambient air introduction passage operatively connected to an inlet opening of the secondary air control valve; and
an air filter operatively connected to the ambient air introduction passage,
wherein the air filter is fastened and mounted within a holding recessed portion formed in a rear part of an upper rear fender member with the outdoor air introduction passage being positioned within a holding groove formed in the upper rear fender member.

2. The exhaust purifying apparatus according to claim 1, wherein the ambient air introduction passage is a U-shaped passage positioned on the upper rear fender member.

3. The exhaust purifying apparatus according to claim 1, wherein the secondary air control valve includes a vacuum introduction portion operatively connected to an intake passage on a downstream side of a carburetor.

4. The exhaust purifying apparatus according to claim 3, and further including a reed valve operatively mounted adjacent to the outlet opening of the secondary air control valve, said reed valve being selectively opened and closed based on a vacuum being supplied to the vacuum introduction portion.

5. The exhaust purifying apparatus according to claim 1, further comprising:
a resonant passage operatively connected to the ambient air introduction passage at an upstream side of the air filter.

6. The exhaust purifying apparatus according to claim 5, wherein the secondary air control valve and the air filter are mounted on the upper rear fender member covering an upper side of a rear wheel.

7. The exhaust purifying apparatus according to claim 5, wherein the exhaust purifying apparatus is positioned on a top of the upper rear fender member covering an upper side of a rear wheel below an occupant seat in a saddle-ride vehicle.

8. The exhaust purifying apparatus according to claim 7, wherein an axis of the inlet opening of the secondary air control valve is oriented in a rear direction of a forward-rearward direction of a vehicle, and the air filter is placed in connection with the ambient air introduction passage from a rear side of the vehicle of the secondary air control valve.

9. The exhaust purifying apparatus according to claim 8, wherein the secondary air control valve is installed at one side of a front part of the upper rear fender member, the air filter is installed at a rear part of the upper rear fender member, and the ambient air introduction passage at an upstream side of the air filter is installed to extend to another side of the front part of the upper rear fender member.

10. An exhaust purifying apparatus of a saddle-ride vehicle comprising:

a secondary air supply pipe having a first end and a second end, said first end being connected to an exhaust passage of an internal combustion engine;

a secondary air control valve being connected to the second end of the secondary air supply pipe for controlling a supply of secondary air to the secondary air supply pipe, an outdoor air introduction passage operatively connected to the secondary air control valve; and an air filter for secondary air and a resonant passage installed in a middle of the outdoor air introduction passage, wherein the air filter is fastened and mounted within a holding recessed portion formed in a rear part of an upper rear fender member with the outdoor air introduction passage being positioned within a holding groove formed in the upper rear fender member.

11. The exhaust purifying apparatus of a saddle-ride vehicle according to claim 10, wherein the outdoor air introduction passage is a U-shaped passage positioned on the upper rear fender member.

12. The exhaust purifying apparatus of a saddle-ride vehicle according to claim 10, wherein the secondary air control valve includes a vacuum introduction portion operatively connected to an intake passage on a downstream side of a carburetor.

13. The exhaust purifying apparatus of a saddle-ride vehicle according to claim 12, and further including a reed valve operatively mounted within said secondary air control valve adjacent to the second end of the secondary air supply pipe, said reed valve being selectively opened and closed based on a vacuum being supplied to the vacuum introduction portion.

14. The exhaust purifying apparatus of a saddle-ride vehicle according to claim 10, wherein the resonant passage is installed in the outdoor air introduction passage at an upstream side of the air filter.

15. The exhaust purifying apparatus of a saddle-ride vehicle according to claim 14, wherein the secondary air control valve and the air filter are mounted on the upper rear fender member covering an upper side of a rear wheel.

16. The exhaust purifying apparatus of a saddle-ride vehicle according to claim 14, wherein the exhaust purifying apparatus is distributively placed on a top of the upper rear fender member covering an upper side of a rear wheel below an occupant seat in the saddle-ride vehicle.

17. The exhaust purifying apparatus of a saddle-ride vehicle according to claim 16, wherein an axis of an inlet opening of the secondary air control valve is oriented in a rear direction of a forward-rearward direction of the vehicle, and the air filter is placed in connection with the outdoor air introduction passage from a rear side of the vehicle of the secondary air control valve.

18. The exhaust purifying apparatus of a saddle-ride vehicle according to claim 17, wherein the secondary air control valve is installed at one side of a front part of the upper rear fender member, the air filter is installed at a rear part of the upper rear fender member, and the outdoor air introduction passage at an upstream side of the air filter is installed to extend to another side of the front part of the upper rear fender member.

19. An exhaust purifying apparatus comprising:

a secondary air supply pipe having a first end and a second end, said first end being adapted to be connected to an exhaust passage of an internal combustion engine;

a secondary air control valve having an outlet opening being connected to the second end of the secondary air supply pipe for controlling a supply of secondary air to the secondary air supply pipe;

an ambient air introduction passage operatively connected to an inlet opening of the secondary air control valve;

an air filter operatively connected to the ambient air introduction passage; and a resonant passage operatively connected to the ambient air introduction passage at an upstream side of the air filter, wherein the secondary air control valve and the air filter are mounted on an upper rear fender member covering an upper side of a rear wheel.

20. The exhaust purifying apparatus according to claim 19, wherein the air filter is fastened and mounted within a holding recessed portion formed in a rear part of an upper rear fender member with the ambient air introduction passage being positioned within a holding groove formed in the upper rear fender member.

* * * * *